(No Model.)
C. W. BOETTNER & H. H. GILCHRIST.
CLOTH CUTTING APPARATUS.
No. 402,652. Patented May 7, 1889.
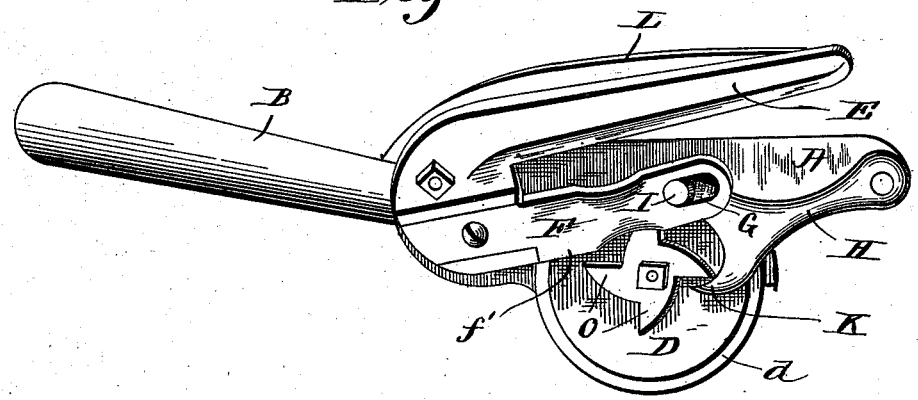
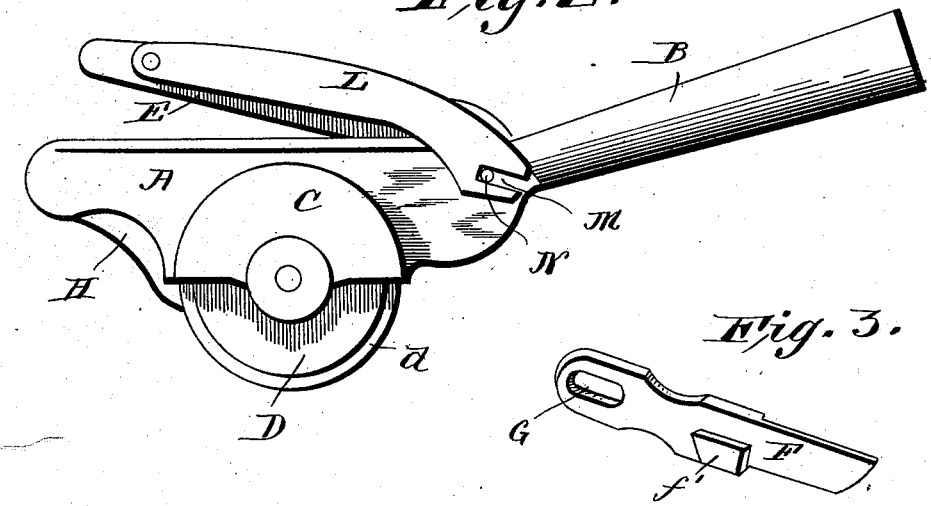
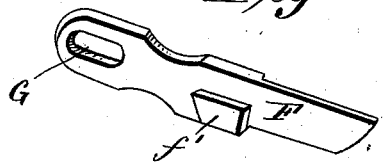
Witnesses.
Inventors
Charles W. Boettner,
Howard H. Gilchrist,
By their Attorneys

UNITED STATES PATENT OFFICE.

CHARLES W. BOETTNER AND HOWARD HECTOR GILCHRIST, OF LITTLE RIVER, KANSAS.

CLOTH-CUTTING APPARATUS.

SPECIFICATION forming part of Letters Patent No. 402,652, dated May 7, 1889.

Application filed August 14, 1888. Serial No. 282,704. (No model.)

*To all whom it may concern:*

Be it known that we, CHARLES W. BOETTNER and HOWARD HECTOR GILCHRIST, citizens of the United States, residing at Little River, in the county of Rice and State of Kansas, have invented new and useful Improvements in Shears, of which the following is a specification.

The object of this invention is to provide simple and easily-operated shears for use in dry-goods establishments where speed and accuracy are the desiderata.

The invention consists in a certain novel construction and combination of devices fully set forth hereinafter in connection with the accompanying drawings and specifically pointed out in the appended claims.

In the drawings, Figure 1 is a view of shears embodying our improvements. Fig. 2 is a side view showing the opposite side. Fig. 3 is a detail view.

Referring by letter to the drawings, A designates the main or lower blade of the shears, to which is attached the handle B, and the said blade is provided at its lower edge with the casing or housing C, in which is mounted the driving-roller D, provided with a rubber periphery, d.

The movable or upper blade, E, is pivoted at its rear end to the main blade and is provided with the operating-arm F, parallel with the blade E, and having a longitudinal slot, G, at its outer end.

H represents a swinging link, which is pivoted at one end to the outer end of the main blade, and is provided at its inner end with a stud, I, which operates in the slot G. The swinging link is also provided at its inner end with the tooth or projection K.

L represents a leaf-spring, which is secured at one end to the outer end of the upper blade and bears at its inner end against the side of the main blade opposite to that on which the upper blade is arranged. The inner end of the spring is provided with a slot, M, which operates on a pin, N, on the side of the main blade, the said pin being preferably formed by an extension of the pivot which connects the blades.

The outer side of the roller is provided with the radial arms or spurs O O, which are adapted as the roller is rotated to engage the operating-arm F, and the tooth or projection on the swinging link.

The operation of the improved shears is as follows: The driving-roller is arranged upright on a counter or table, (on which it is prevented from slipping by the rubber periphery,) and as it is moved it is rotated, and one of the arms or spurs O comes in contact with a shoulder, $f'$, on the operating-arm and raises the latter, thereby raising the upper blade and allowing the fabric to be cut to be arranged between the blades. As soon as the upper blade has reached the limit of its upward movement the arm or spur preceding the one which raised the operating-arm strikes the tooth or projection on the end of the swinging link and draws the upper blade downward.

It will be readily seen that as the rotation of the roller continues the oscillatory movement of the upper blade will continue, and the cutting will be rapidly and satisfactorily accomplished.

The pressure-spring herein described is designed to hold the blades in close contact, so that they may cut accurately and freely.

It is obvious that shears constructed in this manner are more easily operated than the ordinary tailor-shears, and a straight and accurate cut may be made.

The operating-arm, as shown in the drawings, is removably attached to the upper blade, whereby it may be removed to allow the blade to be sharpened.

Having thus described our invention, we claim—

1. In shears, the combination, with the main blade, of the upper blade pivoted thereto and provided with an operating-arm, F, the swinging link H, connecting the outer end of the operating-arm to the outer end of the main blade and provided with the projection or tooth K, and the friction-roller mounted on the main blade and provided with radial arms or spurs adapted to alternately engage the operating-arm and the projection or tooth K, substantially as specified.

2. In shears, the combination, with the main blade, the friction-roller mounted thereon, the upper blade mounted on the main blade and provided with an operating-arm connected to the friction-roller, the pin on the side of the main blade, and the pressure-spring attached to the end of the upper blade and provided with a slot operating on the said pin, substantially as specified.

3. In shears, the combination, with the main blade provided with a suitable casing or housing, of the friction-roller mounted in the casing or housing, provided with a rubber periphery, and having arms or spurs on its side, the upper blade pivoted to the main blade and provided with the operating-arm F, having a slot, G, and a shoulder, $f'$, adapted to be engaged by the arms or spurs, and the swinging link H, mounted on the outer end of the main blade and provided with a stud, I, operating in the slot, G, the said swinging link being further provided with a projection or tooth, K, adapted to be engaged by the arms or spurs on the roller, substantially as specified.

In testimony that we claim the foregoing as our own we have hereto affixed our signatures in presence of two witnesses.

CHARLES W. BOETTNER.
  HOWARD HECTOR GILCHRIST.

Witnesses:
  J. A. H. WILSON,
  GEO. H. WELD.